United States Patent
Compau et al.

(10) Patent No.: US 7,677,982 B2
(45) Date of Patent: Mar. 16, 2010

(54) DUAL CHANNEL VENTED BOOT

(75) Inventors: Richard Alfred Compau, Holly, MI (US); Sam Junior D'Angelo, Shelby Township, MI (US); Michael James Miller, White Lake, MI (US); David G. Sasseen, Allenton, MI (US); Brian Valovick, Royal Oak, MI (US); Hans Wormsbaecher, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 293 days.

(21) Appl. No.: 11/854,182

(22) Filed: Sep. 12, 2007

(65) Prior Publication Data
US 2008/0070706 A1   Mar. 20, 2008

Related U.S. Application Data

(60) Provisional application No. 60/825,633, filed on Sep. 14, 2006.

(51) Int. Cl.
F16D 3/84 (2006.01)

(52) U.S. Cl. .............................. 464/173; 277/928

(58) Field of Classification Search .............. 464/17, 464/173–175; 277/634–636, 928
See application file for complete search history.

(56) References Cited

U.S. PATENT DOCUMENTS

| 4,224,808 | A | 9/1980 | Gehrke |
| 4,282,722 | A | 8/1981 | Orain |
| 4,392,838 | A | 7/1983 | Welschof |
| 4,559,025 | A | 12/1985 | Dore |
| 6,179,717 | B1 | 1/2001 | Schwarzler |
| 6,793,584 | B2 | 9/2004 | Ramey et al. |
| 6,820,876 | B2 * | 11/2004 | Iwano .................. 277/635 |
| 2003/0102638 | A1 * | 6/2003 | Iwano .................. 277/634 |

* cited by examiner

*Primary Examiner*—Greg Binda
(74) *Attorney, Agent, or Firm*—Jennifer M. Brumbaugh; Mick A. Nylander

(57) ABSTRACT

A constant velocity joint and a boot for a constant velocity joint are disclosed. The boot generally includes a first channel and a second channel. The first channel is in fluid communication with a joint chamber of the constant velocity joint. The first channel is also in communication with the second channel and generally allows airflow therethrough while resisting clogs from lubricant. Additionally, the second channel generally allows airflow therethrough to the atmosphere while resisting passage of foreign contaminants therethrough.

16 Claims, 2 Drawing Sheets

DUAL CHANNEL VENTED BOOT

CROSS-REFERENCE TO RELATED APPLICATIONS

This application claims priority based on U.S. Provisional Patent Application No. 60/852,633, filed Sep. 14, 2006, which is incorporated herein by reference in its entirety.

TECHNICAL FIELD

The disclosure generally relates to constant velocity joints and to improved vents and venting systems for constant velocity joints.

BACKGROUND

Constant velocity joints (CV joints) are common components in vehicles. Constant velocity joints are often employed where transmission of a constant velocity rotary motion is desired or required. CV joints are typically greased or otherwise lubricated for the life of the component. The joints are preferably sealed to retain the grease or lubricant inside the joint while keeping contaminants and foreign matter, such as water and dirt, out of the joint. Moreover, a sealing boot, which may be made of rubber, thermoplastic, silicone material, or the like usually encloses portions of the CV joints (such as an open end). Additionally, the opposite end of the joint may also be enclosed with an internal cover to close off the CV joint from contaminants.

During operation, a CV joint may create excess internal pressures in the inner chamber of the joint. In such instances, it is often desirable to vent pressurized gases from the chamber of the joint to the outer atmosphere to reduce the internal temperature of the joint. This function can prevent undesirable pressure build-up during operation of the joint that could damage or compromise components such as the sealing boot. Consequently, many CV joints include a vent.

Vent designs generally must strike a compromise between designs that are generally permissive or generally restrictive to flow through the vents. While vents incorporating simple configurations generally freely allow venting of gases to and from the joint chamber, such designs necessarily also allow intrusion of water or other external contaminants. On the other hand, vents incorporating relatively complex features may offer more resistance to water and other external contaminants, but may restrict venting of gases to and from the joint chamber.

Accordingly, there is a need in the art for a vent for a CV joint which allows for proper venting of the joint chamber with the external atmosphere, improved sealing of the joint chamber against exterior contaminants, and increased resistance to clogs from joint lubricant.

SUMMARY

Various examples directed to a constant velocity joint and a boot for a constant velocity joint are disclosed herein. An illustrative example of a constant velocity joint includes a shaft, a cover cooperating with the shaft to define a joint chamber, and a boot disposed about the shaft. A first illustrative example of a boot includes a first channel in communication with a joint chamber that is generally straight, and a second channel in communication with the first channel and the atmosphere, the second channel being generally angled.

A second illustrative example of a boot includes a first channel in communication with the joint chamber that is generally permissive to airflow therethrough and generally resistive to clogging from a lubricant, and a second channel in communication with the first channel and the atmosphere. The second channel is generally permissive to airflow therethrough and generally restrictive to passage of an external contaminant therethrough.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
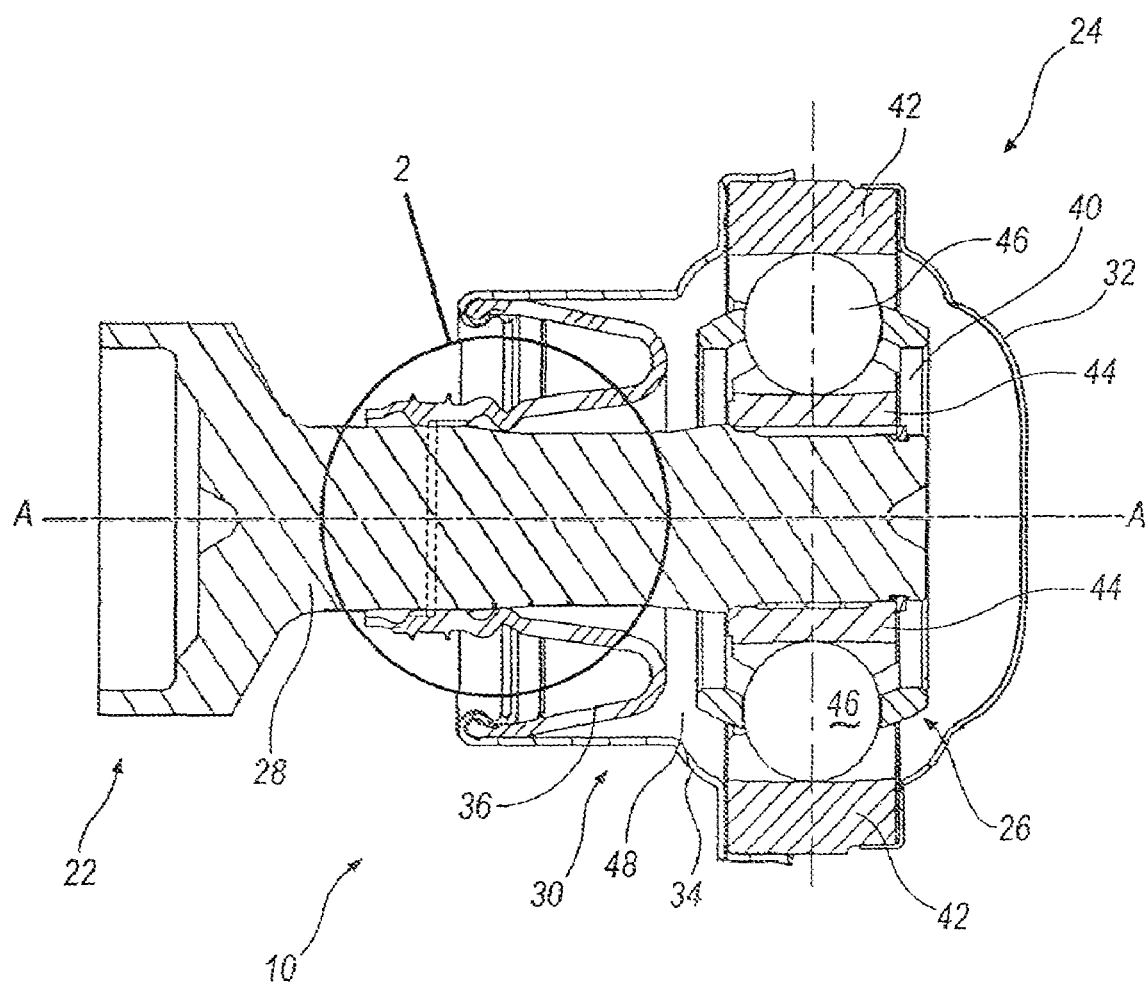
FIG. 1 is a sectional view of a constant velocity joint according to an embodiment.

Referring to the drawings, a constant velocity joint (CV Joint) 10, according to an embodiment of the present invention, is shown. It should be noted that all types of CV joints, such as plunging tripods, a fixed tripod, etc., may be used with the present invention. One of ordinary skill in the art will recognize the advantages realized by the invention in substantially all types of constant velocity joints, and, therefore the invention should not be limited to the illustrated embodiments.

Further, reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Referring to FIG. 1, a CV joint 10 having a central axis A-A is illustrated according to an embodiment. CV joint 10 includes driving end 22 and a driven end 24. CV joint 10 further includes a joint assembly 26 coupled to a shaft 28 with a boot cover assembly 30 connected therebetween. CV joint 10 may further include a grease cover 32 that seals the driven end 24. Grease cover 32 may include a vent valve assembly (not shown), as is generally known in the art. Boot cover assembly 30 may include a metal cover 34 and a flexible CV joint boot 36. A portion of metal cover 34 is crimped onto boot 36 for attachment thereto. Boot cover assembly 30 and the grease cover 32 protect the moving parts of CV joint 10 during operation by retaining the grease or lubricant inside the joint while keeping contaminants and foreign matter, such as water and dirt, out of the joint assembly 26.

Joint assembly 26 includes a cage 40, a first rotational member or outer race 42, a second rotational member or inner race 44, and a plurality of balls 46. Cage 40 retains balls 46 between the first rotational member 42 and the second rotational member 44 in a generally equally spaced circumferential orientation. Shaft 28 is splined to second rotational member 44 to allow axial movement therebetween.

Collectively, at least the shaft 28, boot cover assembly 30, first rotational member 42, and grease cover 32 form a joint chamber 48. Joint chamber 48 contains grease or other lubricants (not shown) for lubrication between cage 40, first rotational member 42, second rotational member 44, and balls 46. During operation of CV joint 10, lubricant contained within joint chamber 48 will generally be drawn outwards towards first rotational member 42 by centrifugal forces generated by the spinning of CV joint 10. This results in the formation of a "grease-free zone" around a center portion of joint chamber 48, typically including at least shaft 28. The size of the grease-free zone will depend partly on the amount of lubricant contained within joint chamber 48.

Figure 2:
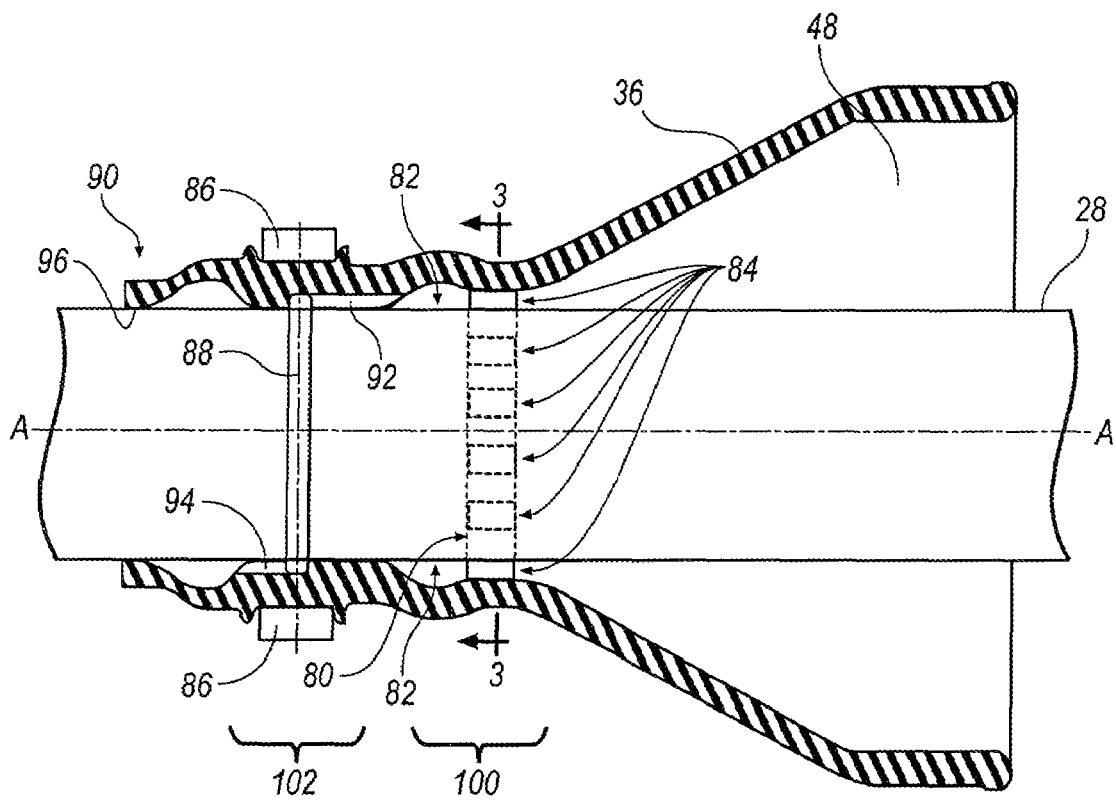
FIG. 2 is an enlarged partial sectional view of the boot of FIG. 1.

Turning now to FIG. 2, CV joint boot 36 is illustrated in further detail according to an embodiment. CV joint boot 36 comprises a stiffening rib portion 80 disposed on an inner surface of boot 36. Stiffening rib portion 80 may be formed integrally with boot 36. Stiffening rib portion 80 contacts shaft 28 and generally provides additional stability to CV joint boot 36, and increases the ability of boot 36 to withstand fatigue occurring over the life of CV joint 10 as a result of articulation of shaft 28 within CV joint 10. An intermediate chamber 82 is formed between boot 36 and shaft 28 that is disposed between joint chamber 48 and a neck clamp 86. Intermediate chamber 82 is in communication with joint chamber 48 through a first channel 100, and is in further communication with the external atmosphere through a second channel 102, which vents to the external atmosphere through a flap portion 96. Flap portion 96 generally inhibits external contaminants from intruding into second channel 102 by sealing against shaft 28, as further described below.

Figure 3:
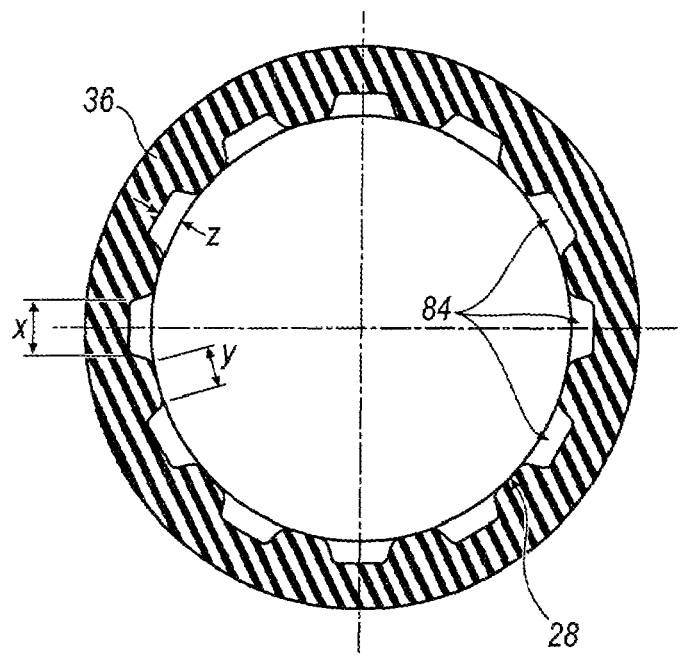
FIG. 3 is a cross-sectional view taken along line 3-3 of FIG. 2.

First channel 100 may include at least one generally straight groove 84 disposed on an interior surface of CV joint boot 36 adjacent shaft 28. For example, as shown in FIG. 2, twelve longitudinal grooves 84 are formed as part of stiffening rib portion 80, and are spaced about a perimeter of shaft 28. Longitudinal channels 84 may be aligned generally longitudinally, i.e., generally parallel with axis A-A of shaft 28 and/or boot 36. Longitudinal grooves 84 may be any size, shape, or configuration that is convenient. For example, as shown in FIG. 3, longitudinal grooves 84 may have a width x, a depth z, and be spaced apart by a distance y. Merely by way of example, in one embodiment where boot 36 is injection molded of a rubber material, longitudinal grooves 84 each have a width that is at least approximately 75% as large, and no more than 750% as large, as distance y, and have a depth z that is between approximately 0.5 millimeters and 3.0 millimeters. While these dimensions may be convenient for purposes of manufacturing boot 36 in an injection molding process, any size and shape of longitudinal grooves 84 may be employed.

Turning back to FIG. 2, longitudinal grooves 84 and shaft 28 thereby form generally straight channels between joint chamber 48 and intermediate chamber 82, which generally do not inhibit the flow of air therethrough. First channel 100 is thereby generally permissive to the venting of air from joint chamber 48. Stiffening rib portion 80 may generally prevent lubricant from reaching or entering first channel 100. Nonetheless, some lubricant may reach first channel 100, for example, while CV joint 10 is at rest. However, the generally straight layout of first channel 100 generally allows the lubricant to flow back into joint chamber 48. By way of non-limiting example, lubricant may flow back into joint chamber 48 during initial startup of CV joint 10, when the lubricant flows towards first rotational member 42 to form the grease-free zone, or during cooldown, when gases contained within joint chamber 48 may contract to create a backpressure drawing the lubricant towards joint chamber 48. First channel 100 thereby resists clogging from the lubricant and allows venting therethrough during operation of CV joint 10. First channel 100 may thereby generally prevent lubricant from reaching second channel 102.

Second channel 102 preferably comprises at least one angled or undulating channel or groove. For example, second channel 102 may include a circumferential groove 88 disposed on an interior surface of CV joint boot 36 between intermediate chamber 82 and an end 90 of CV joint boot 36. Circumferential groove 88 may extend partially about the perimeter of shaft 28, and preferably extends approximately 180 degrees, about shaft 28. A first longitudinal groove 92 may extend from one end of circumferential groove 88 to allow circumferential groove 88 to be in communication with intermediate chamber 82. A second longitudinal groove 94 may extend from an opposite end of circumferential groove 88 to allow circumferential groove 88 to vent to the external atmosphere through flap portion 96. Intermediate chamber 82 may therefore vent to the external atmosphere through second channel 102. Circumferential groove 88, first and second longitudinal grooves 92, 94 and shaft 28 thus form a channel which is more restrictive to the passage of water or other external contaminants therethrough than first channel 100 as a result of the angled construction of second channel 102.

Second channel 102 may be made further restrictive to the entry of water or other external contaminants by the use of flap portion 96, which may be disposed on an end 90 of CV joint boot 36. Flap portion 96 generally allows air from intermediate chamber 82 to exit through the second channel formed by circumferential groove 88 and first and second longitudinal grooves 92, 94 while restricting flow of external contaminants such as water or debris into intermediate chamber 82. Flap portion 96 is preferably pliable or flexible enough to allow the venting of air or gases out of joint chamber 48, while also allowing flap portion 96 to be drawn against shaft 28 by a backpressure from within joint chamber 48. This generally may occur as a result of the contraction of gases within joint chamber 48 after operation of CV joint 10, while the temperature of CV joint 10 is decreasing from a relatively higher operating temperature to an ambient temperature.

During operation of CV joint 10, joint chamber 48 may generally sustain elevated temperatures as a result of friction between the various components of CV joint 10. Upon reaching an elevated temperature, air contained within joint chamber 48 will generally be allowed to vent through first channel 100, and into intermediate chamber 82. The air will generally be allowed to further vent through second channel 102. While some lubricant may possibly reach first channel 100, any lubricant will generally remain within intermediate chamber 82. The lubricant may generally be prevented from reaching second channel 102 by, for example, locating second channel 102 beyond the grease-free zone of CV joint boot 10. As such, any lubricant reaching intermediate chamber 82 will generally remain within intermediate chamber 82 or flow back into joint chamber 48 through first channel arrangement 100 upon cool-down or rotation of CV joint 10.

One of skill in the art will recognize that other embodiments of first channel arrangement 100 and second channel arrangement 102 not specifically described herein are possible in addition to the generally straight and angled embodiments described herein. Virtually any channel configuration may be employed in place of first channel arrangement 100 that allows air or other gases to flow relatively freely therethrough, while also resisting clogging from any lubricant from joint chamber 48 which may reach first channel arrangement 100 during operation. Similarly, virtually any channel configuration may be used in place of second channel arrangement 102 that allows air to flow relatively easily therethrough while providing at least some resistance to the passage of water or other external contaminants therethrough. Such other embodiments not specifically described herein should not be construed as beyond the scope of the invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A boot for a constant velocity joint having a joint chamber, the boot comprising:
   a first channel in communication with the joint chamber, said first channel being generally straight and allowing lubricant entering said first channel to flow back into the joint chamber;
   a second channel in communication with said first channel and the atmosphere, said second channel including:
   a circumferentially extending groove;
   a first longitudinal groove extending from an end of said circumferentially extending groove; and
   a second longitudinal groove extending from an opposite end of said circumferentially extending groove; and
   an intermediate chamber in fluid communication with said first channel and said second channel.

2. The boot of claim 1, further comprising a stiffening rib, wherein said stiffening rib defines said first channel.

3. The boot of claim 1, wherein said first channel is oriented generally longitudinally with respect to the boot.

4. The boot of claim 1, wherein the boot is formed of one of a flexible rubber, thermoplastic and a silicone material.

5. The boot of claim 1, wherein said first channel is formed along an inner surface of the boot.

6. The boot of claim 1, further comprising a flap portion, wherein said second channel is configured to vent to the atmosphere through said flap portion.

7. The boot of claim 6, wherein said flap portion is configured to deflect to allow fluid communication between the second channel and the atmosphere.

8. A constant velocity joint, comprising:
   an outer race defining in part a joint chamber;
   an inner race arranged within said outer race;
   a rolling element disposed between said inner race and outer race;
   a shaft engaging said inner race;
   a cover cooperating with said shaft to define a joint chamber; and
   a boot disposed about said shaft, said boot including:
   a first channel in communication with the joint chamber, said first channel being generally straight and allowing lubricant entering said first channel to flow back into the joint chamber;
   a second channel in communication with said first channel and the atmosphere, said second channel including:
   a circumferentially extending groove;
   a first longitudinal groove extending from an end of said circumferentially extending groove; and
   a second longitudinal groove extending from an opposite end of said circumferentially extending groove; and
   an intermediate chamber in fluid communication with said first channel and said second channel.

9. The constant velocity joint of claim 8, wherein said boot further includes a stiffening rib, wherein said stiffening rib defines said first channel.

10. The constant velocity joint of claim 8, wherein said first channel is oriented generally longitudinally with respect to said shaft.

11. The constant velocity joint of claim 8, wherein said first channel is formed along an inner surface of said boot.

12. The constant velocity joint of claim 8, wherein said circumferentially extending groove extends at least partially about said shaft.

13. The constant velocity joint of claim 8, wherein said boot further includes a flap portion disposed at an end of said boot, wherein said second channel is configured to vent to the atmosphere through said flap portion.

14. The constant velocity joint of claim 8, wherein said boot is secured to said shaft at a first end and secured to said cover at a second end, and said first and second channels are disposed at said first end of said boot.

15. A boot for a constant velocity joint having a joint chamber, the boot comprising:
   a first channel in communication with the joint chamber, said first channel being generally permissive to airflow therethrough and generally resistive to clogging from a lubricant;
   a second channel in communication with said first channel and the atmosphere, said second channel being generally permissive to airflow therethrough, said second channel being generally restrictive to passage of an external contaminant therethrough, and said second channel including:
   a circumferentially extending groove;
   a first longitudinal groove extending from an end of said circumferentially extending groove; and
   a second longitudinal groove extending from an opposite end of said circumferentially extending groove; and
   an intermediate chamber in fluid communication with said first channel and said second channel.

16. The boot of claim 15, wherein said first channel is generally straight, and said second channel is angled.

* * * * *